United States Patent [19]

Tokar et al.

[11] Patent Number: 5,902,364
[45] Date of Patent: *May 11, 1999

[54] CONICAL FILTER

[75] Inventors: Joseph C. Tokar, Apple Valley; Gary R. Gillingham, Prior Lake; Wayne M. Wagner, Apple Valley; Daniel T. Risch; Jim C. Rothman, both of Burnsville; Fred H. Wahlquist, Bloomington; Edward A. Steinbrueck, Eden Prairie; Steven A. Carter, Eagan, all of Minn.

[73] Assignee: Donaldson Company, Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/638,703

[22] Filed: Apr. 26, 1996

[51] Int. Cl.⁶ .................... B01D 29/07; B01D 29/48
[52] U.S. Cl. .................... 55/498; 55/502; 55/503; 55/520; 55/521; 55/DIG. 5
[58] Field of Search .................... 55/385.3, 484, 55/498, 502, 503, 511, 520, 521, DIG. 5; 210/493.4, 497.1, 497.3

[56] References Cited

U.S. PATENT DOCUMENTS

| | | | |
|---|---|---|---|
| D. 342,990 | 1/1994 | Jaroszczyk | D23/365 |
| 1,639,133 | 8/1927 | Greene . | |
| 1,729,135 | 9/1929 | Slauson . | |
| 2,038,071 | 4/1936 | Wilhelm . | |
| 2,115,577 | 4/1938 | Goldman | 210/169 |
| 2,190,886 | 2/1940 | Schaaf et al. . | |
| 2,322,546 | 6/1943 | Sigmund . | |
| 2,397,759 | 4/1946 | Sigmund . | |
| 2,552,615 | 5/1951 | Baltzer | 55/520 X |
| 2,558,185 | 6/1951 | Leisen | 55/520 |
| 2,599,604 | 6/1952 | Bauer et al. | 210/169 |
| 3,020,977 | 2/1962 | Huppke et al. . | |
| 3,025,963 | 3/1962 | Bauer | 210/493 |
| 3,025,964 | 3/1962 | Summers et al. | 210/493 |
| 3,037,637 | 6/1962 | Bub | 210/487 |
| 3,076,554 | 2/1963 | Bub | 210/487 |
| 3,112,184 | 11/1963 | Hollenbach | 210/493.4 X |
| 3,112,262 | 11/1963 | Parkinson | 210/130 |
| 3,323,963 | 6/1967 | Summers | 156/192 |
| 3,346,121 | 10/1967 | Bally | 210/493 |
| 3,738,088 | 6/1973 | Colosimo | 55/385.3 X |
| 3,759,391 | 9/1973 | Dreher | 210/494 |
| 3,807,150 | 4/1974 | Maracle | 55/498 |
| 3,858,793 | 1/1975 | Dudrey | 233/2 |
| 3,962,097 | 6/1976 | Reiman et al. | 210/435 |
| 4,039,457 | 8/1977 | Schacht et al. | 210/493.1 |
| 4,157,902 | 6/1979 | Tokar | 55/385.3 |
| 4,310,419 | 1/1982 | Nara et al. | 210/493.4 |

(List continued on next page.)

FOREIGN PATENT DOCUMENTS

| | | |
|---|---|---|
| 0 152 513 | 8/1985 | European Pat. Off. . |
| 0 152 513 A2 | 8/1985 | European Pat. Off. . |
| 0 630 672 A1 | 12/1994 | European Pat. Off. . |
| 2148726 | 3/1973 | France . |
| 671 096 | 2/1939 | Germany . |
| 0703823 | 2/1954 | United Kingdom ............ 55/520 |
| 764846 | 1/1957 | United Kingdom . |
| 808 154 | 1/1959 | United Kingdom . |
| 808154 | 1/1959 | United Kingdom . |

*Primary Examiner*—Robert Spitzer
*Attorney, Agent, or Firm*—Merchant, Gould, Smith, Edell, Welter & Schmidt

[57] ABSTRACT

A conical filter device inserts into a duct having flow passing from upstream to downstream. The filter device includes fluted filter media having flutes formed therein and a housing. The filter forms a seal between the outer edge of the filter at the downstream side and the housing. The upstream face of the filter is conical shaped in a first embodiment and frusto-conical in a second embodiment with the housing roughly corresponding to the shape of the filter. The filter elements are formed by winding layers of filter media to form a circular cross-section. The elements are moved axially as they are wound or placed on a shaping form while the sealant is still pliable to shape the element.

27 Claims, 10 Drawing Sheets

U.S. PATENT DOCUMENTS

| | | | |
|---|---|---|---|
| 4,410,427 | 10/1983 | Wydeven | 210/317 |
| 4,430,223 | 2/1984 | Miyakawa et al. | 210/493.5 |
| 4,439,321 | 3/1984 | Taki et al. | 210/493.1 |
| 4,460,388 | 7/1984 | Fukami et al. | 55/269 |
| 4,589,983 | 5/1986 | Wydevan | 55/498 X |
| 4,652,286 | 3/1987 | Kusuda et al. | 55/523 |
| 4,704,863 | 11/1987 | Abthoff et al. | 60/311 |
| 4,782,912 | 11/1988 | Wandless | 181/229 |
| 4,925,561 | 5/1990 | Ishii et al. | 210/493.3 |
| 4,936,413 | 6/1990 | Lee | 181/264 |
| 5,015,379 | 5/1991 | Drori | 210/411 |
| 5,106,397 | 4/1992 | Jaroszczyk et al. | 55/498 X |
| 5,125,940 | 6/1992 | Stanhope et al. | 55/385.3 |
| 5,174,895 | 12/1992 | Drori | 210/411 |
| 5,316,676 | 5/1994 | Drori | 210/411 |
| 5,320,657 | 6/1994 | Adams | 55/463 |
| 5,322,537 | 6/1994 | Nakamura et al. | 55/523 |
| 5,458,666 | 10/1995 | Miyakata | 55/521 X |
| 5,512,075 | 4/1996 | Ninomiya et al. | 55/497 |
| 5,522,909 | 6/1996 | Haggard | 55/498 X |
| 5,549,722 | 8/1996 | Zemaitis et al. | 55/521 X |
| 5,549,724 | 8/1996 | Mochida | 55/521 |

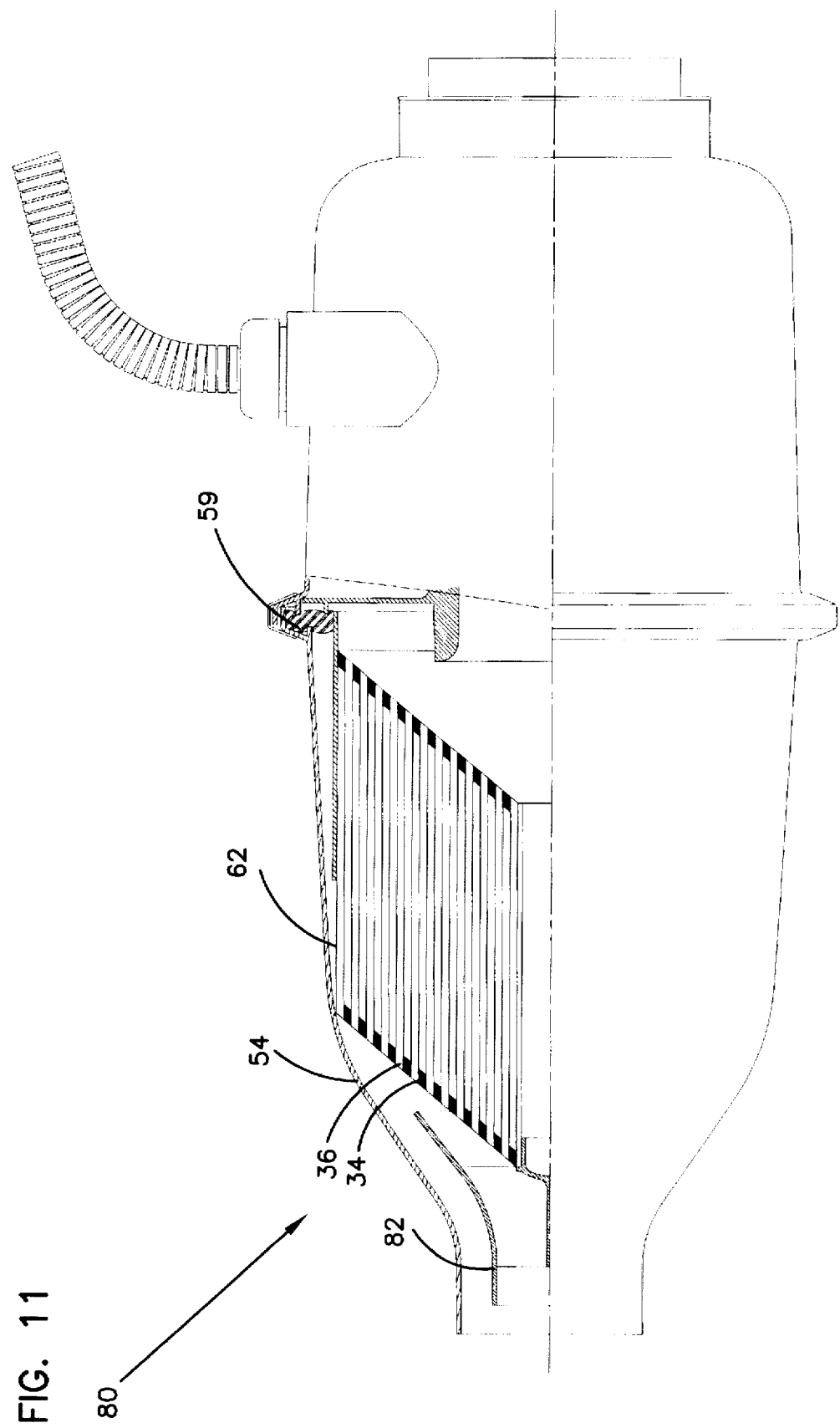

CONICAL FILTER

BACKGROUND OF THE INVENTION

1. Field of the Invention

The present invention relates to a conical filter and in particular to a conical filter of fluted filter media for placement inline in a fluid stream, and a method for making the filter.

2. Description of the Prior Art

Fluid filters are used for a wide variety of applications. Fluid filters typically use a filter element inside of a housing having an inlet and an outlet so that the fluid passes through the filter media, thereby trapping particulate material. Aerodynamic conical filters are generally used for high velocity fluid flow applications, such as automobile air intake filters. In the past there has been little usage of conical filters mainly due to problems with size and effectiveness. Generally, these filters have used pleated filter media. With the pleated filters, straight through flow is not possible. This causes high pressure differentials across the filter and flow distribution problems. To combat these problems, designers have generally increased the spacing between the pleats, thereby reducing the density of the filter media. This has reduced the effective life of the filters and has not solved the flow distribution problem. These filters have also had the added problem in that the filter media is not self supporting. Generally, rigid housings are required for use of these filters.

Another shortcoming with typical prior filter designs is unequal flow distribution. Flow is often directed to a center portion of filters, thereby loading the filter unevenly. Portions of the filter may load over a much shorter interval, thereby requiring replacement of the filter element. However, if flow were directed more evenly over the entire filter, loading would be more uniform and more gradual, so that the filter life is extended.

An example of a conical filter is shown in U.S. Pat. No. 5,106,397, issued to Ford Motor Company, Apr. 21, 1992. In this patent, a pleated filter is used to filter air to an engine. To force air through the media, the top of each pleat is sealed together so that air cannot escape through gaps in the media. This allows an opening between each pleat for air to enter and flow down the pleat, through the media and out the inside center of the filter. In order to avoid restricting the incoming air, the pleats must be spaced, thus limiting the amount of filtering media available for filtering. An increase in filtering media results in an increase in pressure differential across the filter. Furthermore, for the air to enter the filtering media, it must make a sharp directional turn so as to pass through the filter media, thereby increasing the pressure drop across the filter.

It can be seen then, that an improved conical filter is needed which provides for increased filtering area without an accompanying high pressure differential across the filter. Such a filter should also provide for improved flow distribution and even loading over the entire filter. The present invention addresses these as well as other problems associated with conical filters.

SUMMARY OF THE INVENTION

The present invention is directed to a conical filter and in particular to a conical filter formed of fluted filtering media. In a preferred embodiment of the invention, the permeable filter media used in the filter has corrugated sheets of filtering material sealed to sheets of filtering media at alternating ends, forming filtering flutes, which can be rolled into a conical shape. The alternating ends of each flute are sealed off such that the fluid enters through the dirty side of the flute and is forced through to the clean side such that the particulate material is deposited onto the filtering media.

In a conical filter, the filter media is coiled in a spiraling configuration about a center winding portion, forming an upstream face and a downstream face, such that the filtering flutes are substantially parallel to the incoming fluid flow. This allows the dirty fluid to enter the filter media without making an abrupt directional change and, hence, reduces the pressure differential across the filter media. Moreover, because the fluid is allowed to enter the filtering media without making an abrupt directional change, it is not necessary to have spaces in between the filtering flutes as is necessary with pleated filters. Therefore, the present arrangement allows for a maximum filtering area for a given volume without a corresponding increase in pressure differential currently associated with the prior art devices and also increases the life of the filter element.

Another advantage of the conical shape is the distribution of particulate across the filter. As the incoming dirty fluid hits the bullet-shaped face of the conical filter, the flow is pushed from the inner to the outer portion of the filter media such that the fluid flow across all portions of the filter is relatively even. This distribution of particulate further increases the filtering effectiveness and the effective life of the filter element.

The inline capability provides for a reduction in space with greater media filtering area over presently used filter elements and housings.

The present invention also includes methods for making the conical filter. According to a first method, the filter is made by providing a strip of fluted filter media having the plurality of fluted compartments formed therein. The filter media is then coiled about a mandrel. While the media is being coiled about the mandrel, a bead of sealant is applied to adjacent layers of the coil, thereby, closing off alternate sections of the fluted material. Before the sealant hardens, the coiled filter media is placed on a conical forming tool. By forcing the coiled filter media onto the conical forming tool, the center portion of the media is extruded longitudinally to form a conical filter face. The filter is then allowed to cool to a hardened state. According to a second method, the filter media is wound in a spiral, forming a conical filter face as the filter media is wound and the sealing bead is applied.

It can be appreciated that with the present invention, an increased filtering area can be accomplished without an accompanying increase in pressure differential. Because of this, the present filter can accept higher fluid flows and has a longer effective life.

These features of novelty and various other advantages which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals indicate corresponding elements throughout the several views:

FIG. 11 shows a side elevational view of a further alternate embodiment of the present invention including a flow distribution vane;

DETAILED DESCRIPTION OF THE PREFERRED EMBODIMENTS

Figure 1:
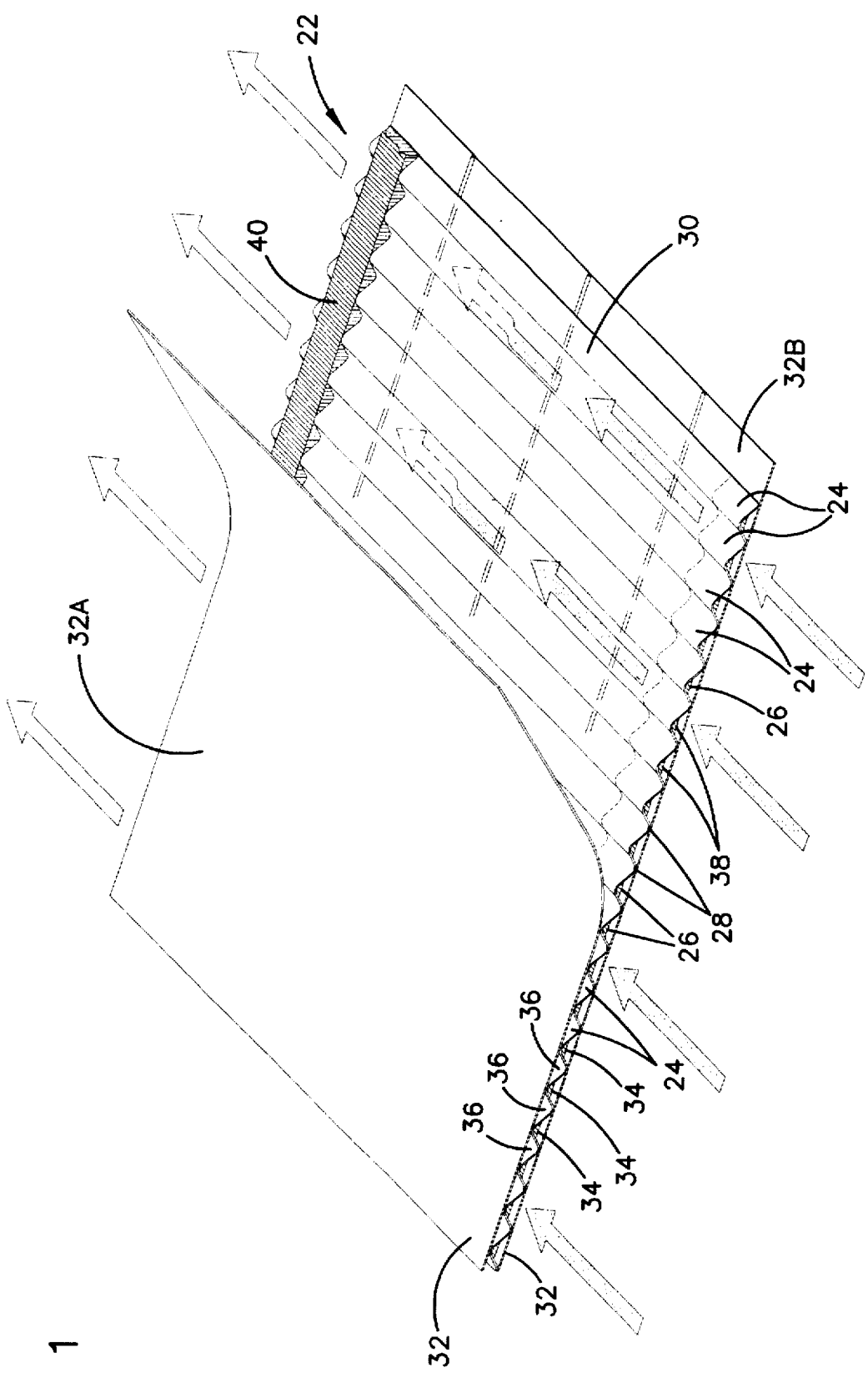
FIG. 1 shows a perspective view of fluted filter media for the filter apparatus according to the principles of the present invention.

Referring now to the drawings, and in particular to FIG. 1, there is shown a portion of a layer of permeable fluted filter media, generally designated 22. The fluted filter media 22 includes a multiplicity of flutes 24 which form a modified corrugated-type material. The flute chambers 24 are formed by a center fluting sheet 30 forming alternating peaks 26 and troughs 28 mounted between facing sheets 32, including a first facing sheet 32A and a second facing sheet 32B. The troughs 28 and peaks 26 divide the flutes into an upper row and lower row. In the configuration shown in FIG. 1, the upper flutes form flute chambers 36 closed at the downstream end, while upstream closed end flutes 34 are the lower row of flute chambers. The fluted chambers 34 are closed by first end bead 38 filling a portion of the upstream end of the flute between the fluting sheet 30 and the second facing sheet 32B. Similarly, a second end bead 40 closes the downstream end 36 of alternating flutes 24. Adhesive tacks connect the peaks 26 and troughs 28 of the flutes 24 to the facing sheets 32A and 32B. The flutes 24 and end beads 38 and 40 provide a filter element 22 which is structurally self-supporting without a housing.

During use, unfiltered fluid enters the flute chambers 36 which have their upstream ends open as indicated by the shaded arrows. Upon entering the flute chambers 36, the unfiltered fluid flow is closed off by the second end bead 40. Therefore, the fluid is forced to proceed through the fluting sheet 30 or face sheets 32. As the unfiltered fluid passes through the fluting sheet 30 or face sheets 32, the fluid is filtered as indicated by the unshaded arrow. The fluid is then free to pass through the flute chambers 34, which have their upstream end closed and to flow through the downstream end out the filter media 22. With the configuration shown, the unfiltered fluid can filter through the fluted sheet 30, the upper facing sheet 32A or lower facing sheet 32B, and into a flute chamber 34 blocked on its upstream side.

Figures 2A, 2B:
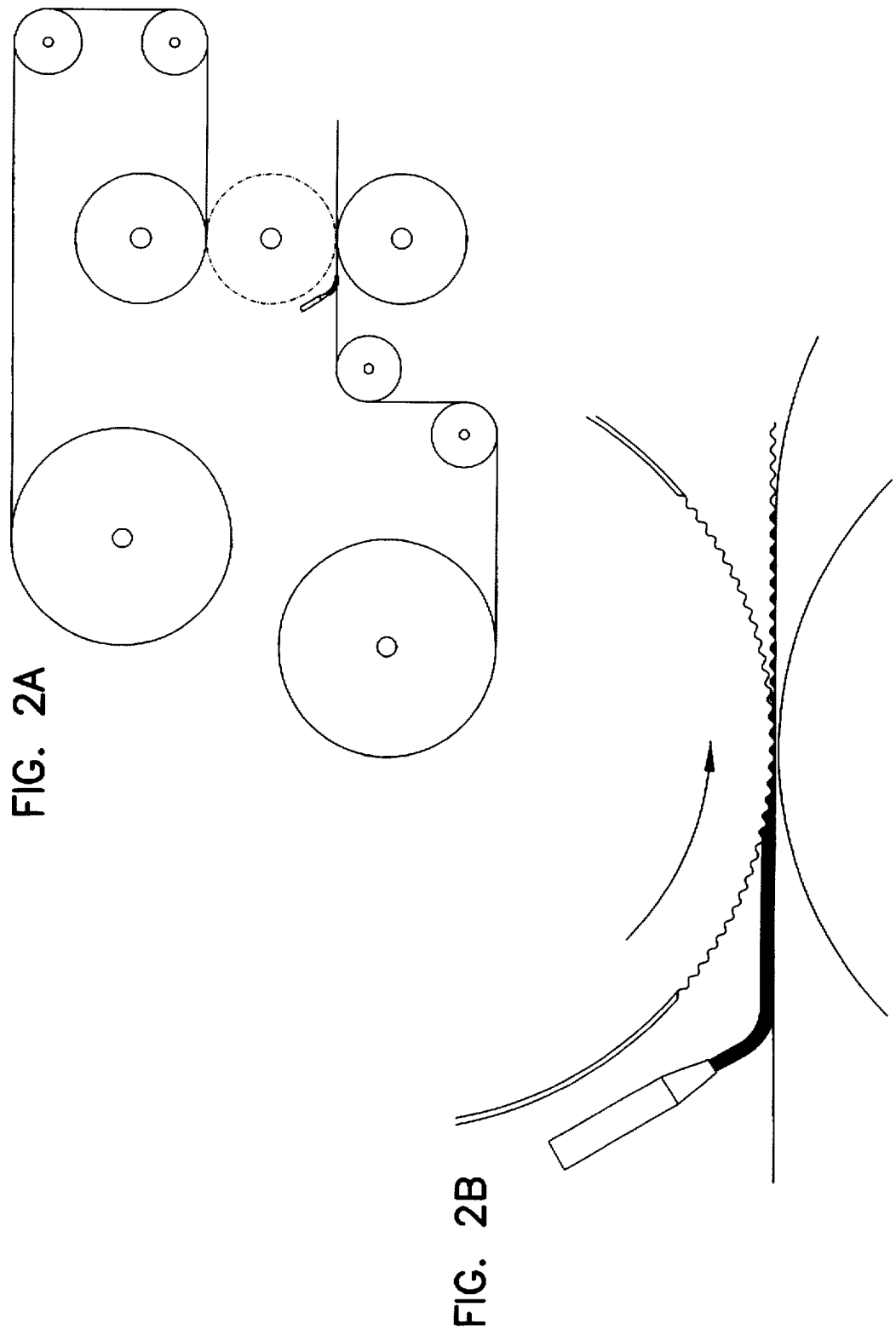
FIGS. 2A–2B show diagrammatic views of the process of manufacturing the filter media shown in FIG. 1.

Referring now to FIGS. 2A–2B, the manufacturing process for fluted filter media which may be rolled to form filter elements, as explained hereinafter, is shown. It can be appreciated that when the filter media is spiraled, with adjacent layers contacting one another, only one facing sheet 32 is required as it can serve as the top for one fluted layer and the bottom sheet for another fluted layer. Therefore, it can be appreciated that the fluted sheet 30 need be applied to only one facing sheet 32.

As shown in FIG. 2A, a first filtering media sheet is delivered from a series of rollers to a crimping roller 44 forming a nip with a second opposed roller 45. In a similar manner, a second sheet 32 is fed to the rollers 44 and 45. A sealant applicator 47 applies a sealant 46 along the upper surface of the second sheet 32 prior to engagement between the crimping roller 44 and the opposed roller 45. As shown in FIG. 2B, the first sheet 30 engages the corrugated surface of the roller 44, and as it is pressed between the opposed roller 45, takes on a corrugated or fluted configuration matching that of the corrugated roller 44. The troughs 28 have a sealant applied at their apex or are otherwise welded to the facing sheet 32 to form flute chambers 34. The sealant 46 forms first end bead 38 between the fluted sheet 30 and the facing sheet 32. The resultant structure of the facing sheet 32 sealed at one edge to the fluted sheet 30 is the layerable filter media 48, shown in FIG. 3.

Figure 3:
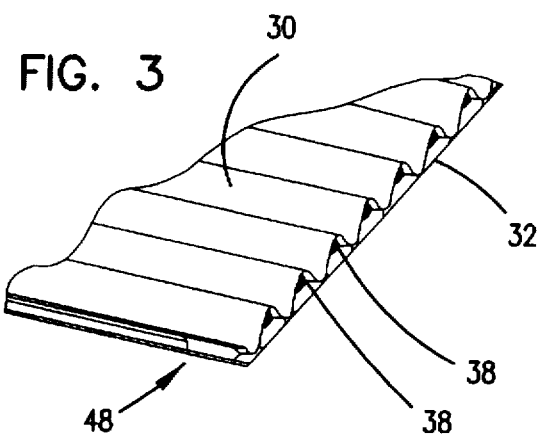
FIG. 3 shows a detail perspective view of a layer of filter media for a filter according to the principles of the present invention.
Figure 4:
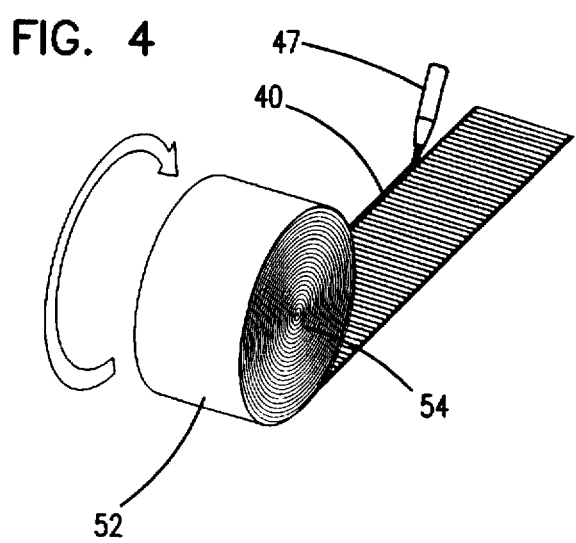
FIG. 4 shows a perspective view of the fluted filter media spiraled in a cylindrical configuration according to the principles of the present invention.
Figure 5:
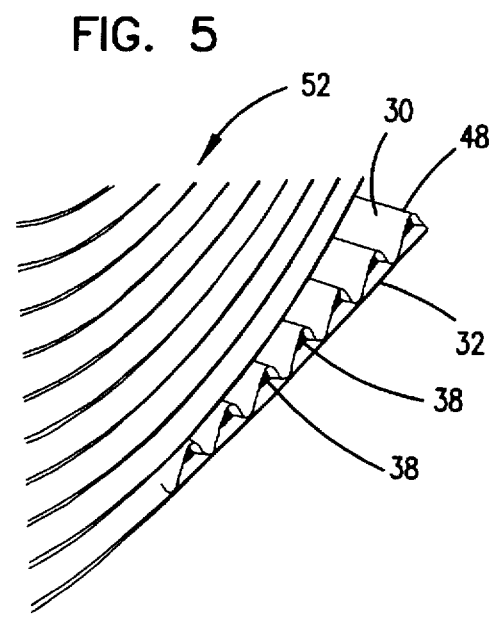
FIG. 5 shows a detail perspective view of a portion of the spiraled fluted filter media for the filter element shown in FIG. 4.

When forming a conical filter, a filter media spiral, as shown in FIG. 4 is formed. It can be appreciated that the filter media layer 48 having a single backing sheet 32 and a single end bead 38 shown in FIG. 3 can be wound to form a spiral-type cylindrical filter element, generally designated 52, shown in FIG. 4 and shown in greater detail in FIG. 5. To form the spiral filter element 52, a bead of sealant is applied lengthwise on a mandrel 54. An end of the single sided fluted filter media 48 is secured to the mandrel 54 via the bead of sealant. The single sided fluted filter media 48 is then rolled onto the mandrel 54 as a second end bead 40 along a second edge of the filter media is applied with the sealant applicator 47 to the pleated side of the single sided fluted filter media 48, as shown in FIG. 4. As the pleated filter media 22 is rolled onto the mandrel 54, the second end bead 40 adheres to the first facing sheet 32 of the single sided fluted filter media 48, as shown in FIG. 3. It can be appreciated that when the filter media is wound onto the mandrel, with adjacent layers contacting and sealing peaks and troughs of flutes, only one facing sheet is required as it serves as the top layer for one flute and the bottom layer for another flute. Therefore, as the second end bead 40 adheres to the first facing sheet 32 the downstream closed end flute 36 for the filter media spiral 52 is formed. When the required length of single sided fluted filter media 48 is rolled onto the mandrel 54 such that the diameter of the filter media spiral 52 is as required, an outer sealing bead is applied to the free end of the single sided fluted filter media 48. The free end of the pleated filter media is then secured to the facing sheet 32 such that the free end adheres to the filter media spiral 52.

The filter media is configured so that when filtering, dirty fluid, as indicated by the shaded arrows, enters the upstream open ended flute chambers 36 which have their upstream ends open. After entering the upstream open ended flute chambers 36, the unfiltered fluid engages the second end bead 40. Therefore, the fluid is forced to proceed through the fluting sheet 30. As the unfiltered fluid passes through the fluting sheet 30, the fluid is filtered as indicated by the unshaded arrow. The fluid is then free to pass through the downstream open end flute chambers 34, which have their upstream end closed, and out the filter media 48. In addition, the unfiltered fluid can filter through the facing sheet 32 to the chambers 34.

Figure 6:
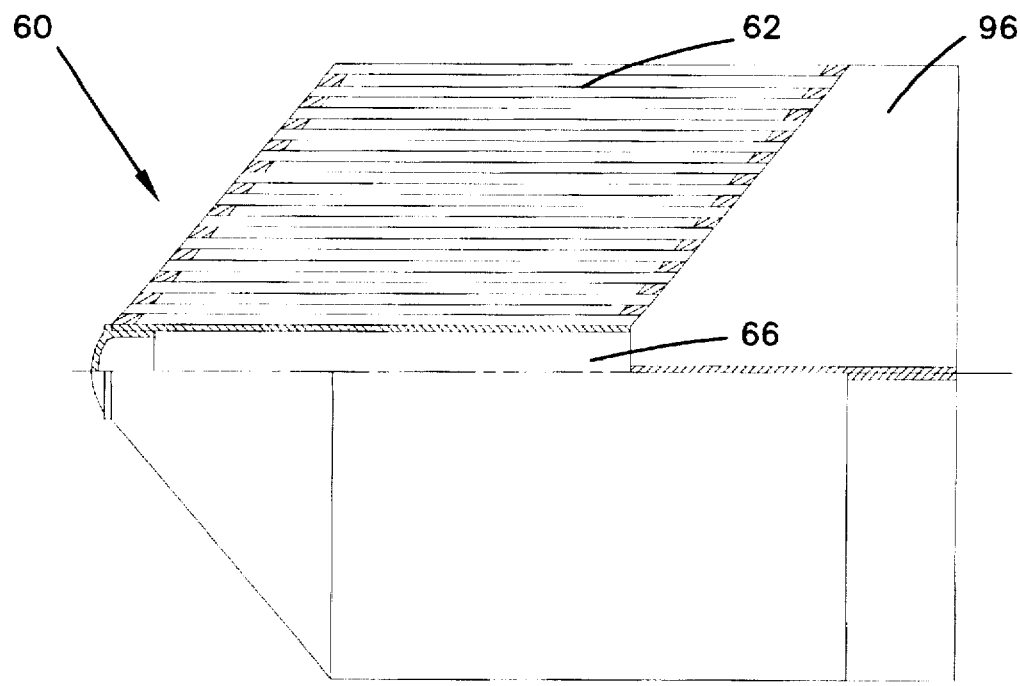
FIG. 6 shows a side elevational view of a first method of forming a conical filter element on a conical forming support.

The conical filters can be made by several manufacturing techniques. While the sealant on the filter media spiral is still warm and pliable, the filter is somewhat moldable. In a first method, at this stage, the filter media spiral 52 is pressed against a conical forming tool 96, as shown in FIG. 6, such that the filter media spiral 52 forms a conical shaped element 62. The conical filter media spiral 52 is then allowed to remain on the conical forming tool until it reaches a hardened state and is therefore rigid. The conical filter element 62 is then removed from the conical forming tool 96 and may be fitted with gasket seals 59.

Figure 7:
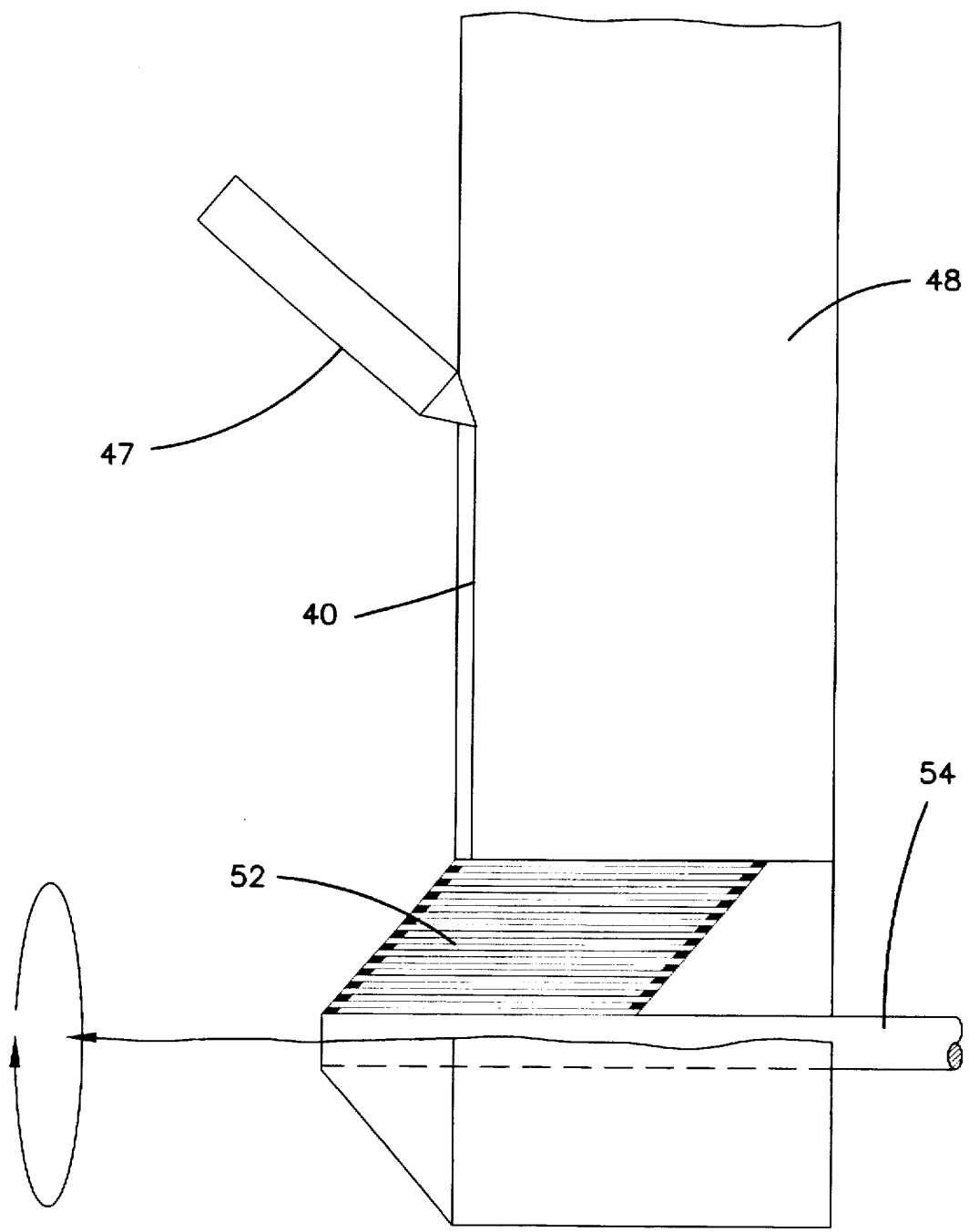
FIG. 7 shows a second method of forming a conical filter element.

It can be appreciated that the conical filter may also be made by the method shown in FIG. 7, wherein single-sided fluted filter media 48 is rolled onto a mandrel 54. With the second manufacturing method, the mandrel moves axially relative to the sealant applicator 47. This causes the layer of single-sided filter media 48 to wind in a spiraling configuration. The second end bead 40 is deposited by the sealant applicator which is held steady as the mandrel 54 and the already-wound filter media move axially. In this manner, the second end bead 40 is at the leading face of the conical filter 62 which spirals outward to form a conical face. The second bead 40 seals the adjacent layers of peaks and troughs of flutes so that only a single facing sheet 32 is required, as it serves as the top of one layer and the bottom of the next. It can be appreciated that the mandrel may be held axially stationary; however, this requires that both the sealant applicator 47 and the feed of the single-sided fluted filter media 48 move axially relative to the mandrel so that a conical filter is formed.

Figure 8:
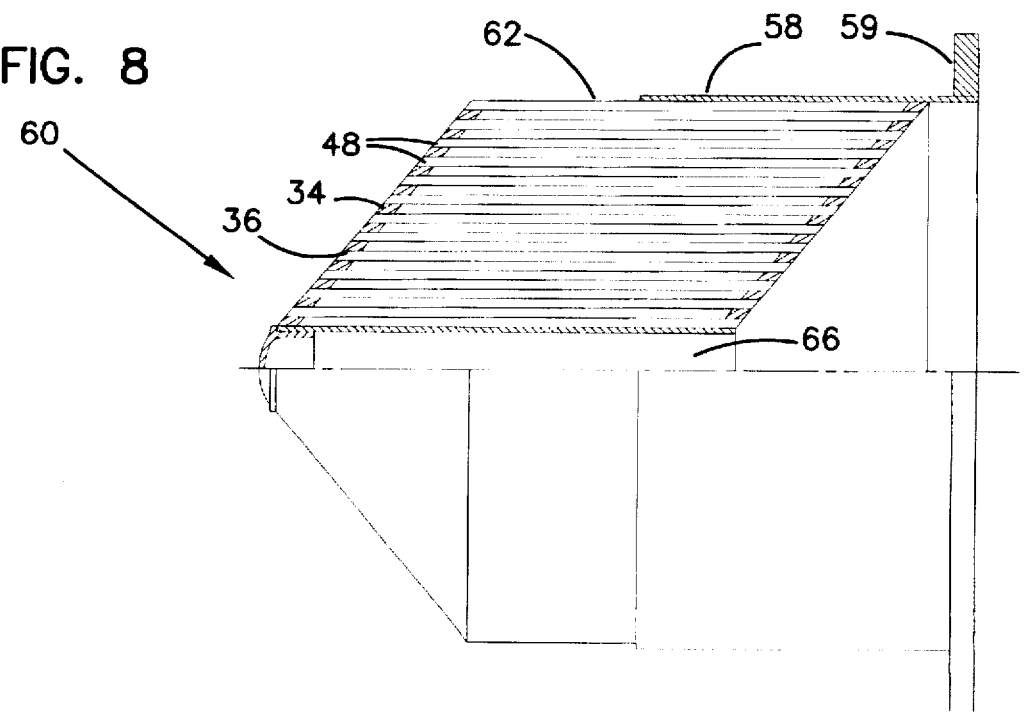
FIG. 8 shows a side elevational view of a conical filter according to the principles of the present invention.

Referring now to FIG. 8, there is shown a first embodiment of a conical filter 60 having a conical filter element 62. The conical filter 60 includes an outer skin for filter housing 58 and a center plug 66. The filter 60 includes single sided fluted filter media 48, which is wound around the center plug 66. It can be appreciated that the center plug 66 may be the mandrel upon which the filter media is wound, or if the mandrel has been removed, the center orifice may have a cap or cover. The filter element 62 has preferably been formed into a conical shape by the methods described above. The single sided fluted filter media 48 has alternating upstream closed end flutes 34 and upstream opened end flutes 36, as previously shown in FIGS. 1 and 5. Viewing from the downstream side, there are alternating downstream closed end flutes 36 and downstream opened end flutes 34. In a preferred embodiment, the outer covering for the filter housing 58 includes gaskets 59, for placement of the filter element 62 into a housing 54.

Figure 9:
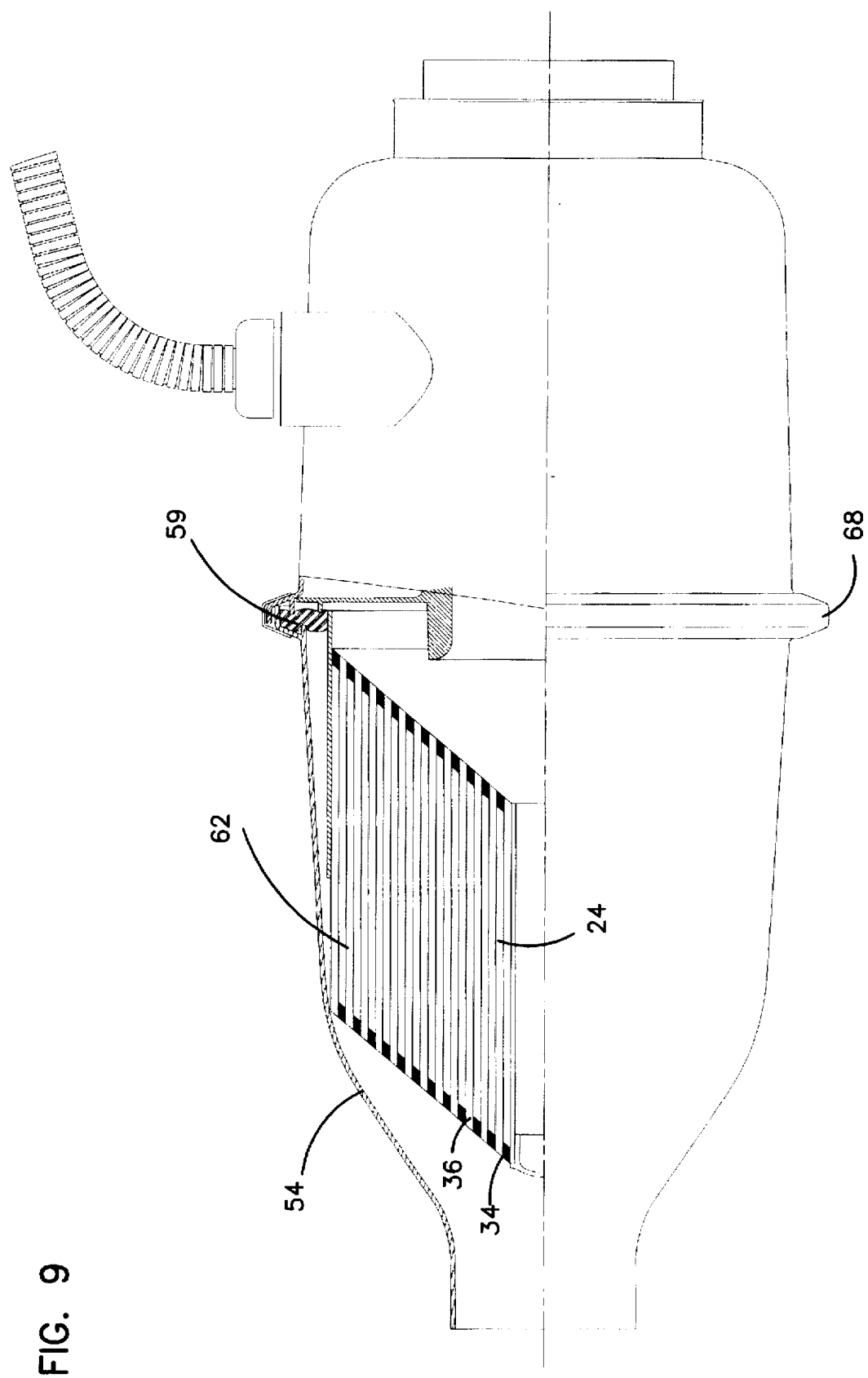
FIG. 9 shows a side elevational view of the conical filter shown in FIG. 8 in combination with a filter housing.

Fluid cleaner housing 54, shown in FIG. 9, is an existing housing for automotive air filtering purposes. Preferably, the cleaner housing 54 is constructed out of molded plastic. The filter 60 is inserted into the inlet end of the cleaner housing 54. The filter 60 is held in place by a compression ring 68 which seals the gasket 59 between the upstream and downstream sections of the cleaner housing 54.

As the flow enters the cleaner housing 54, the conical shape of the upstream face of the filter 60 forces the fluid from the inside of the conical filter 60 towards the periphery of the face of the filter 60. This results in relatively even fluid flow distribution across the filter. This is accomplished without abrupt directional changes which also decreases pressure differential across the filter over the prior art. After the flow passes through the filter 60, it exits on the downstream side of the filter 60 and passes through the downstream side of the cleaner housing 54. More particularly, as the flow approaches the filter 60, it enters through an upstream open end flute 36. As the flow passes through the upstream opened end flute 36, it is forced by the downstream closed end of flute 36 to pass through the wall of the flute 36 into a downstream open ended flute 34. Particulate material which had been carried into the upstream opened end flute 36 will be deposited on the inside wall of the upstream opened end flute 36.

Figure 10:
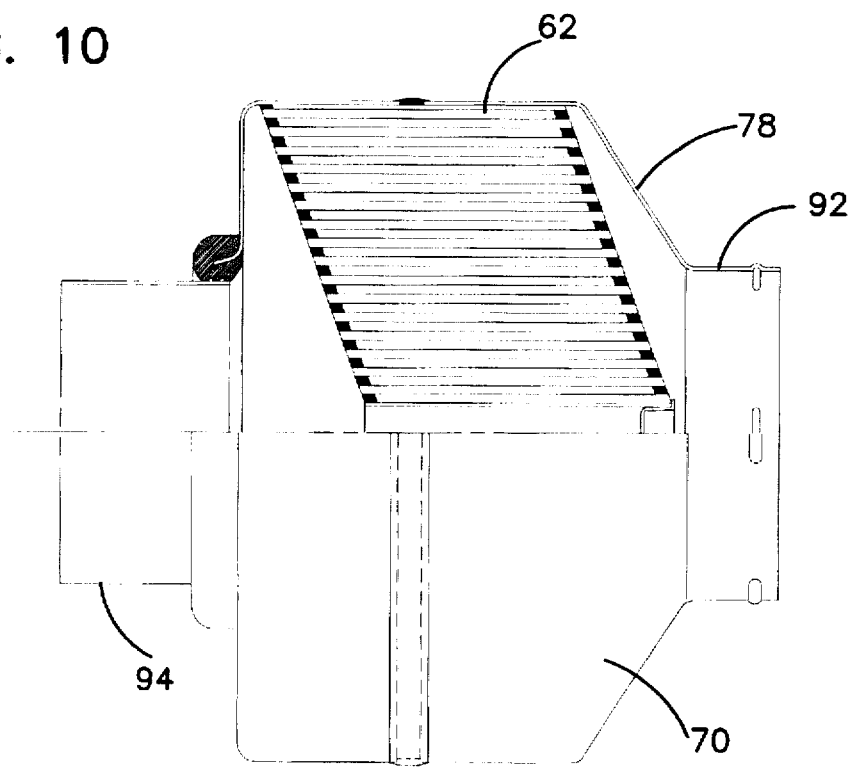
FIG. 10 shows a side elevational view of an alternate embodiment of the invention wherein the filter is encased in its own housing and can be inserted inline in a fluid flow.

An alternate preferred embodiment of the filter 70 is shown in FIG. 10. The embodiment shown in FIG. 10 has the filter 60 in a stand-alone housing 78. This embodiment is configured so that it can be adapted to other existing inline filter applications. More particularly, the stand alone housing 78, which is preferably constructed of molded plastic, is fitted with an inlet neck 92 and an outlet neck 94 so that the stand alone housing 78 can be fitted inline in a fluid stream.

Another alternate embodiment of the present invention, generally designated 80, is shown in FIG. 11. A circular or annular vane or baffle 82 is placed at the inlet opening of the filter housing 54. It can be appreciated that the vane 82 provides for increased fluid flow at the outermost regions of the conical filter element 62, thereby providing even distribution of fluid flow across the entire conical filter element 62. This embodiment, therefore provides for more even distribution of particulate and more uniform particulate loading. Hence, the filter element achieves an extended life.

Figure 13:
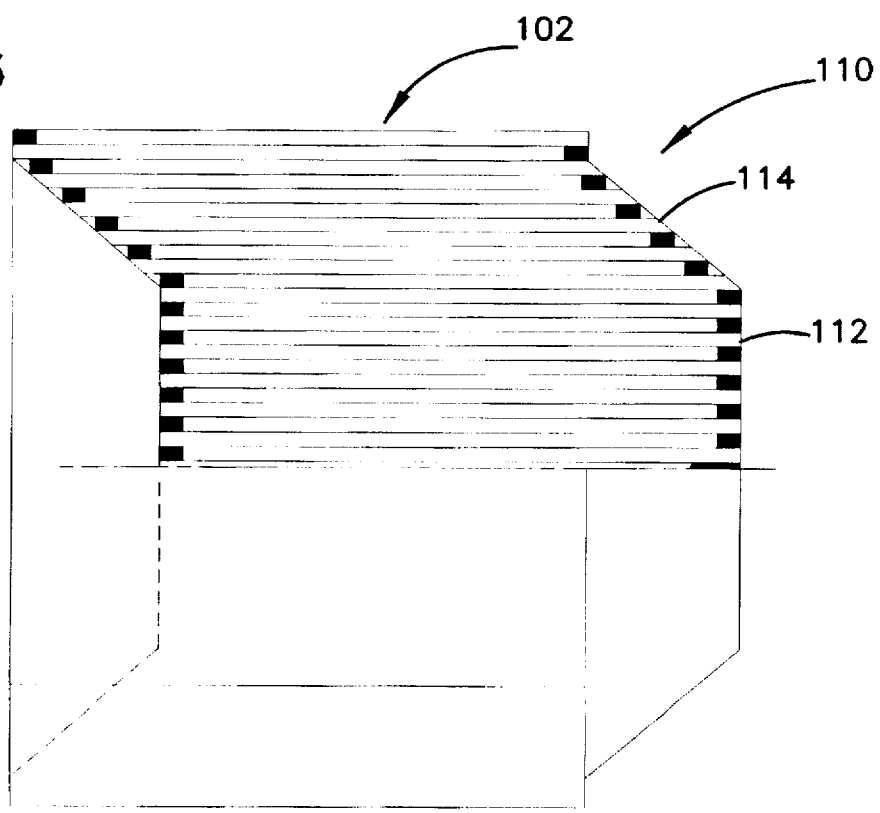
FIG. 13 shows a side view of an alternate embodiment of the present invention showing a frusto-conical filter.
Figure 14:
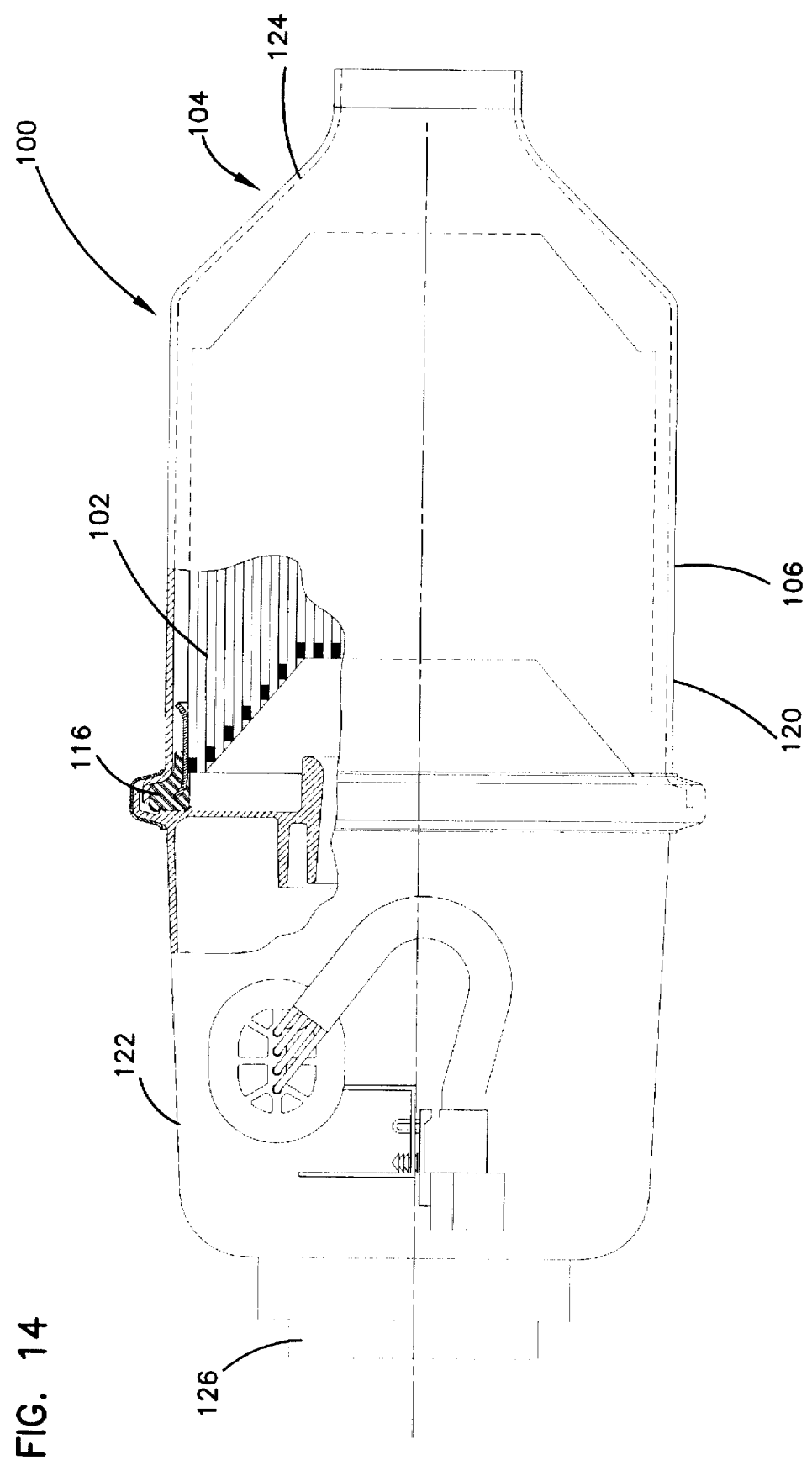
FIG. 14 shows a side partial sectional view of the filter shown in FIG. 13 and an associated housing.

Referring now to FIGS. 13 and 14, there is shown a further embodiment of a filter according to the present invention, generally designated 100. The filter 100 includes a frusto-conical shaped filter media element 102 and an associated filter housing 104. The filter media element 102 includes an upstream face 110 which gives the filter media 102 a frusto-conical configuration. The upstream face 110 includes a central planar portion 112 and an annular outer sloping portion 114. The sloping outer portion is configured to slope outward and away from the central planar portion which is substantially transverse to the prevailing upstream flow. In addition, the filter media may include a downstream gasket 116 which is configured to seal against the side of the housing 104. It can be appreciated that although the filter 100 includes a frusto-conical filter media 102, the methods for making the filter remain unchanged for those shown in FIGS. 7 and 8. The filter media 102 may be placed on a frusto-conical form, while the sealant is still soft, to impart a frusto-conical shape. Alternatively, the filter media 102 may be wound with the mandrel remaining axially stationary for the first portion of the winding to provide the planar upstream central face 112 and then move axially during winding at the outer portion to provide the outer sloping portion of 114.

As shown in FIG. 14, the housing 104 includes a substantially straight housing wall 106. The straight wall 106 provides improved capacity for the filter housing volume. It can be appreciated that with the wall 106 extending substantially parallel to the filter flutes and the prevailing direction of the flow, the wasted space between the outward sloping wall 106 and the outer portion of the filter is minimized. In the embodiment shown in FIG. 14, the housing 104 includes an upstream portion 120 and a downstream portion 122. The gasket 116 of the filter media forms a downstream seal between the housing wall 106 and the filter media 102. The housing 104 also includes an inlet portion 124 adapting to an upstream duct in an outlet portion 126 leading down to the downstream ductwork.

Figure 12:
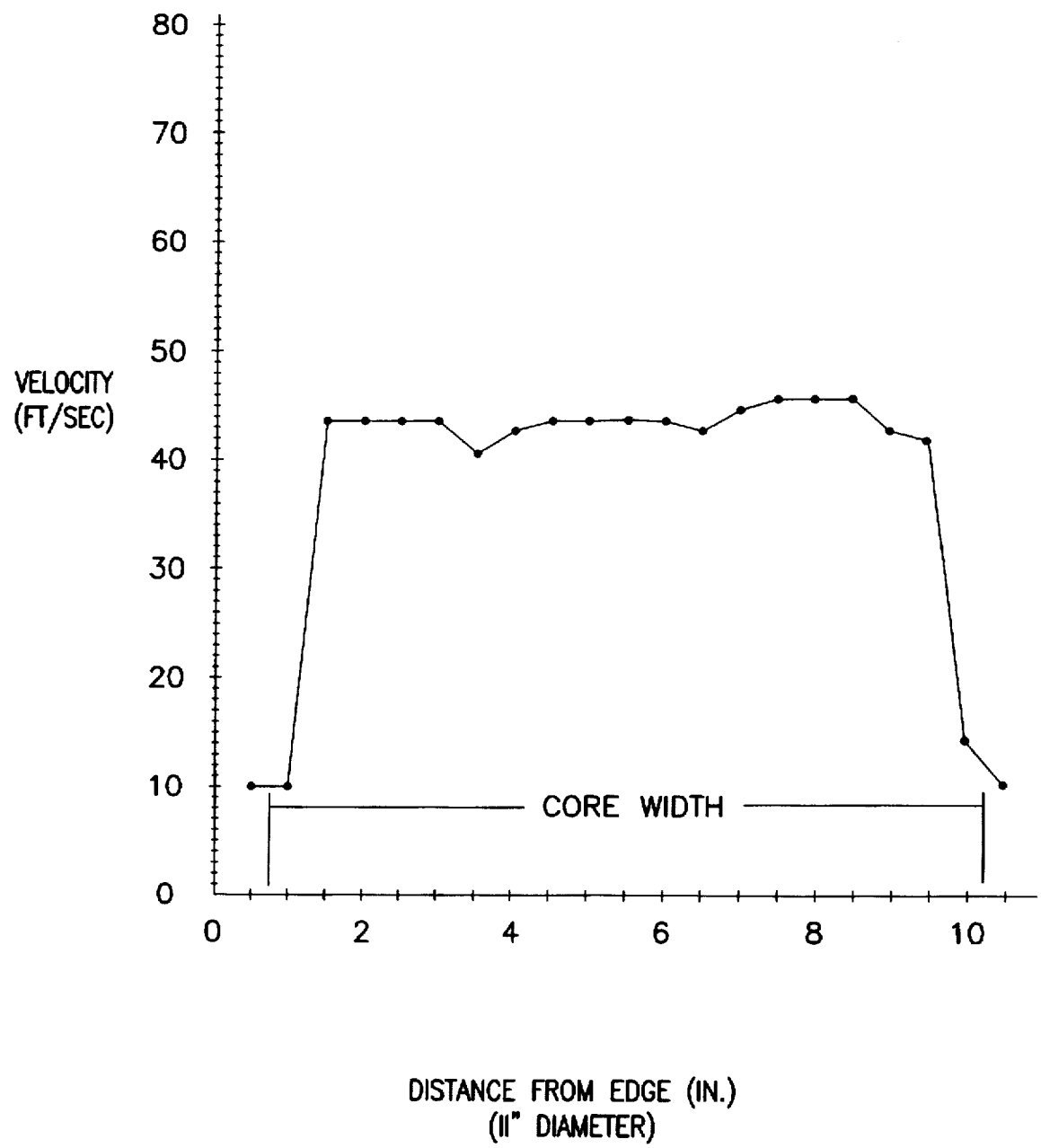
FIG. 12 shows a fluid velocity profile across the conical filter.

Referring now to FIG. 12, there is shown a velocity profile graph across the conical filter 80, shown in FIG. 11. FIG. 12 shows the varying exit velocities of the fluid flow, represented along the Y-axis, in relation to the fluid flow's position as it exits the filter, represented along the X-axis. As is evidenced by the graph, fluid flow across a conical filter of this type has a relatively uniform velocity profile providing the improvements and advantages described herein.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A filter having flow passing from upstream to downstream through the filter, comprising:

filter media comprising a plurality of flutes, wherein each flute defines a fluted chamber extending in a longitudinal direction; said filter media including a corrugated sheet positioned between first and second facing sheets; a continuous first end bead being positioned at a first edge strip between said first sheet and said corrugated sheet; and a continuous second end bead being positioned at a second edge strip between said second sheet and said corrugated sheet;

wherein the filter media is coiled in a spiralling configuration having an outer surface and an upstream and a downstream face; and wherein a portion of the upstream face of the coil slopes outward and downstream.

2. A filter according to claim 1, further comprising a duct receiving the filter, wherein the outer surface forms a seal with the duct.

3. A filter according to claim 1, wherein first ends of the flutes extend to the upstream face and second ends of the flutes extend to the downstream face.

4. A filter according to claim 3, wherein alternating ends of the flutes are closed.

5. A filter according to claim 1, wherein the filter comprises a substantially frusto-conical filter having a substantially planar center portion at an upstream side and an outer portion sloping away from the planar center portion.

6. A filter according to claim 5, wherein the outer portion slopes away from the planar portion at an angle of about 50 degrees.

7. A filter according to claim 5, wherein the outer portion slopes outward and downstream from the planar center portion.

8. A filter according to claim 1, wherein the center portion of the upstream face has a substantially conical configuration.

9. A filter having flow passing from upstream to downstream through the filter, comprising:

a cylindrical filter housing including an upstream end portion of decreased diameter;

filter media comprising a plurality of flutes, each flute defining fluted compartments extending in a longitudinal direction, wherein one end of each compartment is closed, and wherein the closed ends of the compartments are on alternating opposite ends;

wherein the filter media is coiled in a spiralling configuration about a center portion, forming an upstream face and a downstream face, wherein the coil of filter media includes an outer edge forming a seal with the housing; and wherein a center portion of one face of the coil extends longitudinally in a substantially conical configuration.

10. A filter according to claim 9, further comprising a center mandrel, wherein the coil of filter media is wound about the center mandrel.

11. A filter according to claim 9, further comprising flow directing apparatus for spreading the flow radially outward over the filter.

12. A filter according to claim 11, wherein the flow directing apparatus comprises a circular vane in the filter housing upstream of the filter media.

13. A filter according to claim 9, wherein the filter housing includes a side wall extending substantially parallel with the axis of the cylindrical filter housing.

14. A method of making a filter element, comprising the steps of:

providing a strip of fluted filter media having a plurality of fluted compartments formed therein;

coiling the filter media about a mandrel;

sealing adjacent layers of the coil; and, extruding a center portion axially to form a conical filter face.

15. A method of making a filter according to claim 14, wherein the center portion is extruded by forcing the coiled filter media onto a conical-shaped forming tool.

16. A method according to claim 14, wherein the fluted filter media comprises a corrugated type material and a facing sheet tacked together and a continuous first end bead at a first edge strip, thereby forming a strip of fluted filter media having a plurality of fluted compartments formed therein.

17. A method according to claim 16, wherein a first sheet of filter media is delivered to a crimping roller, and a second sheet is supplied to an opposed roller, and wherein sealant is applied along the upper surface of the second sheet prior to engagement between the crimping roller and its opposed roller such that the second sheet is bonded to the corrugated sheet.

18. A method according to claim 16, wherein a second end bead is applied to a second edge of a pleated side of the strip of fluted filter media while the filter media is wound onto the mandrel.

19. A method according to claim 14, wherein a spiral filter is sealed with a heated sealant, and wherein a center portion of the spiral filter is extruded before the sealant is solidifies.

20. A method according to claim 19, wherein the spiral filter is formed by placing the spiral filter onto a conical shaped forming tool before the sealant solidifies.

21. A method according to claim 20, wherein the spiral filter with the center portion extruded is allowed to cool following placement on the forming tool such that it forms a conical shaped spiral filter.

22. A method according to claim 14, wherein the mandrel moves axially relative to the strip of fluted filter media while being coiled.

23. A method according to claim 14, wherein the strip of fluted filter media moves axially relative to the mandrel while being coiled.

24. A method of making a filter element, comprising the steps of:
   providing a strip of fluted filter media having a plurality of fluted compartments formed therein;
   coiling the filter media about a mandrel;
   sealing adjacent layers of the coil; and,
   wherein the mandrel and strip of fluted filter material move axially relative to one another, thereby forming a conical filter face.

25. A method of making a filter element, comprising steps of:
   providing a strip of fluted filter media having a plurality of fluted compartments formed therein;
   coiling the filter media;
   sealing adjacent layers of the coil; and,
   extruding a center portion axially to form a conical filter face.

26. A method of making a filter according to claim 25, wherein the center portion is extruded by forcing the coiled filter media onto a conical-shaped forming tool.

27. A method of making a filter element, comprising steps of:
   providing a strip of fluted filter media having a plurality of fluted compartments formed therein;
   coiling the filter media into a spiral;
   sealing adjacent layers of the coil; and
   wherein the spiral and strip of fluted filter material move axially relative to one another, thereby forming a conical filter face.

* * * * *